US006864196B2

(12) United States Patent
Graham et al.

(10) Patent No.: US 6,864,196 B2
(45) Date of Patent: Mar. 8, 2005

(54) METHOD OF MAKING A LAUNDRY DETERGENT ARTICLE CONTAINING DETERGENT FORMULATIONS

(75) Inventors: Lonzell Graham, Mauldin, SC (US); Samuel Mark Gillette, Whitsett, NC (US)

(73) Assignees: NewLund Laboratories, Inc., Greenville, SC (US); Precision Fabrics Group, Inc., Greensboro, NC (US)

(*) Notice: Subject to any disclaimer, the term of this patent is extended or adjusted under 35 U.S.C. 154(b) by 101 days.

(21) Appl. No.: 09/986,031

(22) Filed: Nov. 7, 2001

(65) Prior Publication Data

US 2003/0207630 A1 Nov. 6, 2003

Related U.S. Application Data

(62) Division of application No. 08/769,391, filed on Dec. 19, 1996.
(60) Provisional application No. 60/008,884, filed on Dec. 19, 1995.

(51) Int. Cl.$^7$ .................................................. B32B 3/00
(52) U.S. Cl. ......................... 442/59; 442/130; 427/541; 427/542; 427/372.2; 427/381; 427/421; 427/428; 427/429; 427/430.1
(58) Field of Search ............................ 442/12, 93, 130, 442/59; 428/306.4, 305.5; 427/541, 542, 372.2, 381, 421, 428, 429, 430.1

(56) References Cited

U.S. PATENT DOCUMENTS

| | | | | |
|---|---|---|---|---|
| 3,625,905 A | | 12/1972 | Heath et al. | |
| 3,914,501 A | | 10/1975 | Miller et al. | |
| 4,005,026 A | | 1/1977 | Heath et al. | |
| 4,095,946 A | | 6/1978 | Jones et al. | |
| 4,113,630 A | | 9/1978 | Hagner et al. | |
| 4,170,565 A | | 10/1979 | Flesher et al. | |
| 4,199,464 A | | 4/1980 | Cambre | |
| 4,199,465 A | * | 4/1980 | Rodriguez | 510/295 |
| 4,220,562 A | | 9/1980 | Spadini et al. | |
| 4,740,326 A | | 4/1988 | Hortel et al. | |
| 4,795,584 A | | 1/1989 | Ross et al. | |
| 4,853,142 A | | 8/1989 | Win et al. | |
| 4,874,537 A | | 10/1989 | Peterson et al. | |
| 4,892,758 A | | 1/1990 | Serbiak et al. | |
| 4,919,835 A | | 4/1990 | Sigl et al. | |
| 4,931,200 A | | 6/1990 | Shanklin et al. | |
| 4,938,888 A | | 7/1990 | Kiefer et al. | |
| 4,953,250 A | * | 9/1990 | Brown | 428/96 |
| 5,030,375 A | | 7/1991 | Sigl et al. | |
| 5,053,157 A | | 10/1991 | Lloyd | |
| 5,110,640 A | | 5/1992 | Mack | |
| 5,154,947 A | | 10/1992 | Branch et al. | |
| 5,196,139 A | | 3/1993 | Moschner | |
| 5,202,045 A | | 4/1993 | Karpusiewicz et al. | |
| 5,298,249 A | | 3/1994 | Hani et al. | |

* cited by examiner

*Primary Examiner*—Elizabeth M. Cole
(74) *Attorney, Agent, or Firm*—Finnegan, Henderson, Farabow, Garrett & Dunner, L.L.P.

(57) ABSTRACT

A laundry sheet is disclosed which is a substrate having a laundry detergent applied thereto. The laundry detergent readily solubilizes off of the substrate sheet during the washing process to provide a total laundering process that cleans and softens. Also disclosed are several laundry detergent formulations which are preferably applied onto the substrate to make the laundry sheet of the present invention and a process for making the laundry sheet.

27 Claims, No Drawings

METHOD OF MAKING A LAUNDRY DETERGENT ARTICLE CONTAINING DETERGENT FORMULATIONS

This is a division of application Ser. No. 08/769,391, filed Dec. 19, 1996, and claims the benefit of U.S. provisional application No. 60/008,884, filed Dec. 19, 1995 which is incorporated herein by reference.

BACKGROUND OF THE INVENTION

The present invention relates to laundry detergents and laundry sheets containing laundry detergents.

Prior to the present invention, laundry detergents were dispensed into washing machines by measuring various amounts of liquid or powder detergents into cups or other measuring devices. This is inconvenient and wastes the consumer's time to have to measure out the correct amount of detergent for each load of laundry. Furthermore, when such liquid or powder detergents are measured out into cups or other measuring devices, there exists a common problem of spillage of detergents around the washing machine.

One attempt to overcome the disadvantages of measuring out detergents was the use of a detergent pouch which was held together with a water soluble adhesive. In theory, the pouch was supposed to become unglued in the wash water and release detergent chemicals into the washing machine. However, the detergent chemicals in the pouch sometimes formed clumps which would not break or solubilize to release detergent into the wash water. Also, residual detergent chemicals could remain on the clothes if the detergents in the pouch formed insoluble clumps.

Another attempt in overcoming the problems of measuring detergents from containers has been the use of tablets containing laundry detergent. These tablets have the drawback of limited solubility in the wash water due to the low surface area for solubilization.

Accordingly, there is a need for a total laundering process that will overcome these problems, and in particular, promote better solubility of detergent chemicals in the wash water and avoid depositing undissolved detergent chemicals on the washed fabrics. Further, there exists the need to provide to the consumer a way to avoid measuring out liquid and powdered laundry detergents while avoiding the solubility and clumping problems of past attempts.

SUMMARY OF THE INVENTION

A feature of the present invention is to provide a laundry sheet containing a predetermined amount of a laundry detergent which will permit the consumer to simply add the laundry sheet to the washing machine and add additional sheets for larger loads or for loads that the consumer expects will be difficult to clean into the washing machine.

Another feature of the present invention is to provide a laundry sheet which can optionally include a fabric softener or other chemicals such as brighteners, oxidizing agents, and the like.

Another feature of the present invention is to provide an environmentally friendly detergent system which will preferably avoid the use of powdered detergents that incorporate fillers to make them flowable.

Another feature of the present invention is to provide a laundry sheet that preferably can be recycled and which avoids the use of fillers which must be processed by waste treatment plants and landfills.

Additional advantages of the present invention will be set forth in part in the description which follows, and in part will be apparent from the description, or may be learned by the practice of the present invention. The advantages of the present invention may be realized and obtained by means of the elements and combinations particularly pointed out in the claims.

To achieve these and other advantages and in accordance with the purpose of the present invention, as embodied and broadly described herein, the present invention relates to a laundry sheet which is a water-insoluble substrate containing a laundry detergent applied thereto. The laundry detergent contains at least one surfactant, and can optionally include one or more of the following: a builder, a complexing agent, an optical brightener, an alkaline source to raise pH, an electrolyte, a foam stabilizer, a fragrance, a color enhancer, a biocide, a corrosion inhibitor, a soil anti-redeposition agent, an encrustation preventer, a fabric softener, enzymes, oxidizing agents, or combinations thereof.

The present invention further relates to particular detergent formulations which can be applied on to a water-insoluble substrate including a detergent formulation which contains a sodium salt of a dodecylbenzene sulfonic acid, an alkylated sulfonated diphenyl oxide disodium salt, a linear alkyl napthalene disulfonate, a zeolite, a bistriazinylaminostilbene, sodium carbonate, an amine oxide or an alkanol amine, a sodium silicate or sodium polysilicate, an isobutylene/maleic anhydride copolymer or a sodium polymethacrylate, and a quarternary ammonium compound.

The detergent formulation when used with the water-insoluble substrate provides cleaning, whitening, brightening, freshening, static electricity control, and fabric softening to laundered articles in the washing machine. The preferred detergent formulations readily solubilize off the water-insoluble sheet during the washing process. Preferably, the water-insoluble substrate containing the detergent formulation is an inexpensive nonwoven which has high loft and fine denier fibers so as to provide maximum surface area to promote dissolution of the detergent formulation at the beginning of the wash cycle. In the preferred detergent formulations, the laundry sheet containing the detergent formulation is dry to the touch to minimize the transfer of detergent chemicals from the sheet to the user's hands.

The present invention also provides a process wherein the detergent formulations are stirred together to produce a homogenous slurry which is pumped into a coating trough or other application device and impregnated into a low denier, high loft and preferably, inexpensive nonwoven. The web is supported in a horizontal and flat position while the water is evaporated from the web. The finished web may be then slit, chopped into squares, and boxed off the end of a tenter frame or rolled up.

It is to be understood that both the foregoing general description and the following detailed description are exemplary and explanatory only and are not restrictive of the present invention, as claimed.

DETAILED DESCRIPTION OF THE PRESENT INVENTION

The present invention relates to a laundry sheet which is a water-insoluble substrate having a laundry detergent applied thereto. Preferably, the laundry detergent readily solubilizes off of the sheet during the washing process.

The substrate sheet can be any fabric or open-cell rubber or plastic foam sheet that is capable of holding a detergent chemical formulation onto its surface. Preferably, the detergent formulation is coated onto or impregnated into the sheet by any means known to those skilled in the art. The sheet is preferably a nonwoven fabric. More preferably, the nonwoven fabric sheet is a nonwoven polyester material. It is also preferred that the fabric sheet have a high loft (e.g., a fabric having a basis weight of about 3.0 oz/sq. yard and a mil thickness greater than 40 mils) and fine denier fibers (e.g., 6 or less denier) which can provide maximum surface area for adhesion of the detergent chemicals and to promote dissolution of the detergent chemicals at the beginning of the wash cycles. Several alternative fabrics that can be used in the present application are nonwovens made by Z-axis infrared bonding of polyester tow bats such as ones produced by Kimberly-Clark. Also, PET (polyethyleneterephthalate) or PBT (polybutyleneterephthalate) melt blowns which are uncalendered can be used. Further, needle punched and melt blown nonwovens made of acrylic, rayon, cotton, nylon, polypropylene, or other fabrics which have a melting point above 300° F. are suitable.

Another preferred fabric sheet is a nonwoven fabric that is a fiber based on a polyester/rayon produced from a hydro-entangled process having a thickness of about 18.5 mils to about 28.75 mils and a fabric weight of about 33 to about 47.5 grams per yard. Further, if the substrate sheet that is used is a polyester or other similar polymer, the sheet after being used in a wash cycle can be recycled with other plastic materials such as plastic bottles.

Additional substrates that can be used in the process of the invention include open-cell foam rubber, and plastic foam. Urethane foam with a melting point above 300° F. is preferred. Examples of such urethane foam can be found in air filtration products and fabric softener sheets.

With respect to the laundry detergent, various formulations can be applied onto the substrate sheet to make the laundry sheet of the present invention. Any detergent formulation which is capable of being applied or coated onto the sheet can be used in the present invention.

Preferably, the laundry detergent contains at least a primary surfactant that has good detergency in all temperatures of wash water in all water hardness conditions, such as a nonionic surfactant. The combination of surfactants and other materials used should preferably dry down to a coating which adheres to the sheet and does not flake off or rub off, but is not necessary for inclusion into the sheet. Also, surfactants which have a dry finish upon drying on the substrate sheet are preferred over those that leave a wet finish.

It is preferred that besides the primary surfactant, one or more nonionic surfactants such as alcohol ethoxylates can also be included. The four preferred nonionic surfactants are linear primary $C_{12}$–$C_{15}$ alcohol 9-nonylethoxylate, e.g., Neodol 25-9 (Shell Chemical Co.), $C_{11}$–$C_{15}$ secondary alcohol ethoxylate, e.g., Tergitol 15-S-9 (Union Carbide), alkyl polyglycosides such as Glucapon 225 (Henkel) and ethylene oxide/propylene oxide block copolymers such as Pluronic F77 (BASF). Substitutes for these preferred nonionic surfactants include, but are not limited to other alcohol ethoxylates such as, Surfonic L-24-9 (Texaco Chemical Co.), nonoxynol-10, such as Surfonic N-95 (Texaco Chemical Co.), and nonoxynol-9, Igepal CO-630 (Rhone-Poulenc). Neodol 25-9 is preferred out of all of these nonanionic surfactants because of its good biodegradability.

Generally, the amount of the primary surfactant included is an amount that is sufficient to remove the soil and stains from clothing. A preferred amount is from about 1% to about 80% by weight and more preferably from about 5% to about 15% by weight of the detergent formulation. If the acid form of the surfactant is used for economic reasons, generally, enough sodium hydroxide or other base is added to neutralize the acid form of the surfactant. Preferably, a 50% sodium hydroxide solution is used in a sufficient amount to neutralize the acid form of the surfactant.

In situations where the primary surfactant by itself or with an optional builder present cannot soften the wash water sufficiently, or if the water is very cold, a nonionic, anionic, or amphoteric surfactant can optionally be added to the detergent formulation in an amount sufficient to augment the detergency of the primary surfactant(s). Nonionic, anionic, and amphoteric surfactants suitable for this application include, but are not limited to, alcohol ethoxylates, alkyl phenol ethoxylates, ethylene oxide/propylene oxide block copolymers, alkyl polyglycosides, alkanolamides, amine ethoxylates, amine oxides, and the like. A preferred amphoteric surfactant is cocoamphocarboxydipropionate e.g., Monateric CEM-38 (Mona Industries).

A preferred primary surfactant that is anionic for purposes of the present invention is alkylated sulfonated diphenyl oxide-disodium salt, commercially available as Dowfax Detergent Solution (Dow Chemical Co.) which has the ability to dry down to a powder and is suitable for hard water detergency. Another preferred surfactant is dioctylsulfosuccinamate, e.g., Aerosol 22 (Cytec Industries, Inc.).

Another anionic surfactant is a sodium salt of dodecylbenzenesulfonic acid (DDBSA) which may be purchased commercially. Alternatively, the acid form of DDBSA can be neutralized with sodium hydroxide to form the sodium salt of DDBSA. This surfactant is available under the tradename Bio-Soft S-100 (Stepan Co., Northfield, Ill.) and substitutes include, but are not limited to, Calsoft LAS-99 (Pilot Chemical Co.), Carsosulf UL-100 (Lonza Inc.), and Witco 1298 Acid (Witco Chemical Co.). Other examples include, but are not limited to, linear primary alcohol ethoxyl sulfates, linear alkyl benzene sulphonates, alcohol sulfates, sodium or potassium salts of long chain fatty acids, carboxylic soaps (e.g., $C_{10}$–$C_{22}$ types), secondary alkane sulphonates, $\alpha$-olefin sulphonates, methylester sulphonates, and the like.

If a nonionic surfactant is also included, generally an amount is added to the detergent formulation to permit the overall detergent formulation to remove soil and stains sufficiently in cold water. Preferably, from about 0 to about 70%, more preferably from about 1% to about 17% by weight of the detergent formulation by weight of one or more nonionic surfactants can be included.

As stated earlier, any detergent which has the ability to remove stains and soil from clothing is suitable as long as it has the ability to be coated or applied onto a substrate sheet.

The following additional components can be also included in the detergent formulation in any combination. In general, these additional components are builders, complexing agents, optical brighteners, oxidizing agents, alkaline sources, electrolytes, foam stabilizers, fragrances, color enhancers, biocides, corrosion inhibitors, soil anti-redeposition agents, encrustation preventers, oxidizing agents, enzymes, and fabric softeners. Any one or more of these components can be present and examples of each of these components are known to those skilled in the art.

It is preferred that the above additional components as well as the primary surfactants and nonionic surfactants have a small particle size range. A small particle size range makes it easier for the detergent formulation to be applied or impregnated onto the fabric sheet. The particle size range is preferably from less than about 200 microns, and more preferably from about 1 micron to about 100 microns for each component that is present in the detergent formulations of the present invention.

With regard to builders and complexing agents, any builder is suitable for use in the detergent formulation of the present invention such as borates, phosphates, polyphosphates, silicates, carbonates, citrates, ethylenediamine tetraacetates, nitrilotriacetates, and the like. Preferred is a zeolite, such as sodium alumina silicate zeolite, e.g., Valfor 100 (PQ Corporation) because of its commercial acceptance in the market and its availability in small particle sizes. Furthermore, this particular zeolite has no toxicity or environmental problems and it is economical to use. Builders that preferably can be dried down to a solid and/or remove divalent and/or polyvalent ions from the wash water, especially iron, copper, calcium, and magnesium, are preferred for inclusion in the detergent formulation of the present invention. Further, builders that work by chelation, ion exchange, or precipitation are suitable for use in the present invention. Generally, if a builder is included in the detergent formulation of the present invention, an effective amount is included to remove a portion of at least one divalent or polyvalent ion from wash water. Preferred amounts of the builder are from about 1% to about 60% by weight of the detergent formulation, more preferably from about 10% to about 20% by weight of the detergent formulation.

Another optional component is an optical brightener which can be added to the detergent formulation of the present invention. Generally, any optical brightener can be included in the detergent formulation of the present invention. The optical brightener should preferably take ultraviolet light and shift its wavelength to light in the visible spectrum. Further, optical brighteners should not hinder detergency, yellow the fabric, or cause any other negative effects such as odor or health concerns. Preferably, the optical brighteners contain bistriazinylaminostilbene for brightening of cellulosics and an additional optical brightener for brightening lower surface energy synthetics. Optical brighteners which can be used to brighten cellulosics include, but are not limited to, Blankophor BBH (Burlington Chemical Co.) (fluorescent brightener 113) and Tinopal 5BM-GX (Ciba Co.) (fluorescent brightener 28). Other suitable brighteners as substitutes for the Blankophor BBH include Phorwite BA (Miles Co.) (fluorescent brightener 113) and Rylux BA (Ostacolor A.S.) (fluorescent brightener 113). Substitutes for the Tinopal 5BM-GX include Photine C (Miles) (fluorescent brightener 28) and Viophos BCU (Viochron S.A.) (fluorescent brightener 28). Tinopal SWN (fluorescent brightener 140) and Blankophor SOL (fluorescent brightener 61) can also be used to achieve the brightening of synthetic fibers as well as Ranipal SWN (Indian Dystuff Ind. Ltd.) (fluorescent brightener 140) and Rylux BCU (fluorescent brightener 140). Generally, the amount of optical brightener, if included in the detergent formulation, is an effective amount to brighten the washed clothing. Preferably, from about 0.005% to about 1.7% by weight of the detergent formulation can be included.

Oxidizing agents may be incorporated into the detergent formulation by using appropriate solvents such as carbon tetrachloride, fluorohydrocarbons or methanol so that forced air drying without heat is possible. Oxidizing agents such as perborates, percarbonates and hypochlorites may be included in the formulation. The preferred range is from 0.1 to 20% of the formula and the most preferred range is from 1 to 5%. Such a formulation may also contain enzymes for removal of stains. Such enzymes include, but are not limited to, proteases such as Burcotase DP-60, (Burlington Chemical Company) lipases such as Burcotase LP-100 and amylases. The preferred range is from 0.01–5% of each enzyme and the most preferred range is from 0.3 to 1%.

The next optional component is an alkaline source to raise the pH of the wash water. While any alkaline source can be used for this purpose, it is preferred that the alkaline source not contribute to any odor and will be dry to the hand once applied to the fabric sheet. A preferred alkaline source is sodium carbonate which also increases the detergency of polar soils. Also, sodium silicates, for instance those sold by PO Corporation and soil anti-redeposition polymers such as the sodium salts of polymethacrylate or methacrylatemaleic anhydride copolymers, e.g., Acusol products (Rohm & Haas) can also contribute to the pH of the wash water. Generally, a sufficient amount of an alkaline source should be added to raise the pH of the detergent formulation to a pH of approximately 9 to about 11.5. Preferably from about 1% to about 60% by weight and more preferably from about 5% to about 20% by weight of the detergent formulation can be used.

The next optional component that can be included in the detergent formulation of the present invention is an electrolyte which if chosen well can also serve as a builder and pH booster. The sodium carbonate referenced above can also serve as an electrolyte which will lower the critical micelle concentration of many surfactants. However, the presence of additional electrolytes may also allow the surfactants to emulsify some oils and dirt at lower concentrations. Examples of additional electrolytes are sodium silicate and sodium borate. Preferred amounts range from about 1% to about 60% by weight, more preferably from about 3% to about 12% by weight, of the detergent formulation.

Foam stabilizers are an additional component that can be added to the detergent formulation. Generally, any foam stabilizer can be used (e.g., amphoterics or anionics) as long as it stabilizes any foam generated by surfactants present in the detergent formulation and an amount should be preferably added that is sufficient to accomplish this purpose. Preferred foam stabilizers include alkanolamides and amine oxides as well as dioctylsulfosuccinamates. Preferred foam stabilizers are coconut amides such as Ethox COA (Piedmont Chemical Industries) or Armid C (Azko). Preferably, from about 5% to about 30%, more preferably from about 2% to about 6% by weight of the foam stabilizer can be added based on the total weight of the detergent formulation.

The next optional component is a fragrance which can be included to mask the odor of the laundry sheets of the present invention and also serve to give the impression to the consumer of freshness. Generally, a sufficient amount of fragrance should only be added to mask the odor of the laundry sheets, and preferably leave a fragrance on the washed clothing. A moderately high molecular weight fragrance which will not volatilize out of the detergent coating during the production/drying process and which will remain on the clothes to a certain extent is preferred. An example of a fragrance is perfume oil Downey Super 0922 (Value Fragrances, Inc.), or Surf M0513 (Value Fragrances, Inc.), which can be present from about 0.01% to about 0.55% by weight of the detergent formulation.

A color enhancer can also be included in the detergent formulation in small amounts. Preferably, a dye or pigment which imparts a small amount of blue color into the fabrics being washed is preferred. This color enhancer should have solubility properties that permits it to remain level throughout the fabric sheet during the production process and will not stain any fabrics in the washload. A sufficient amount can be included that imparts a slight bluing to the fabrics and a preferred color enhancer is Acid Blue 145 like Hastings Sky Blue OB which is an anthraquinone-based dye (Crompton and Knowles) present in an amount from about 0.001% to about 0.5%, more preferably about 0.01 to about 0.025% by weight of the detergent formulation. A less preferred substitute is Acid Blue 25, like Alizarine Blue CL (Crompton and Knowles). Generally, a dye or pigment which is stable in a highly alkaline environment under high temperatures and for prolonged periods of time is desirable.

Another component that can be present in the detergent formulation of the present invention is a biocide which preserves the detergent compositions from attack by microorganisms including bacteria, mildew, and fungus. Preferably, the biocide should be recognized for use in laundry detergents by the United States Environmental Protection Agency, and the biocides should not preferably interact with the surfactant system to minimize the detergency of the surfactants. A preferred biocide is sodium pyrithione or sodium omadine (e.g., sodium 2-pyridine thiol-1-oxide). A dialkyl ammonium chloride, such as dimethyl or diethyl ammonium chloride, which can also be used in amounts from about 0.01% to about 2.0% by weight and more preferably from about 0.16% to about 2.0% by weight based on the total weight of the detergent formulation.

Another optional component is a corrosion inhibitor which protects surfaces such as metals like zippers, buttons, or the inside of washing machines. Preferred corrosion inhibitors include sodium silicate and sodium polysilicate which form a thin inert layer of silicate over the metal surfaces that are susceptible to corrosion. It is preferred that a minimum of about 8 parts per million of sodium silicate or other corrosion inhibitor be present in the wash water. Since sodium silicate is multi-functional and can serve as a builder or a soil anti-redeposition agent, higher levels can be used. In addition to the above preferred corrosion inhibitors, alkanolamides may also serve as corrosion inhibitors. An amount sufficient to prevent the corrosion of metal surfaces should be included and preferred amounts range from about 0.1% to about 5% by weight, more preferably from about 1.5% to about 2.5% by weight based on the total weight of the detergent formulation.

The next optional component that can be present is a soil anti-redeposition agent and/or encrustation preventer. Generally, any known soil anti-redeposition agent can be used. Preferably, the soil anti-redeposition agent is an isobutylene/maleic anhydride copolymer such as Tamol 731A (Rohm & Haas) or a sodium polymethacrylate such as Tamol 850. Other examples of sodium polymethacrylates include Darvan No. 7 (R. T. Vanderbilt Co., Inc.) and Daxad 30 (Hampshire Chemical Co.). In addition, Acusol polymers which are designed specifically for laundry applications can be used in concentrations as high as 40% by weight of the detergent formulation. Specific examples include a copolymer of maleic acid\olefin sodium salt like Acusol 460 (Rohm & Haas) and polyacrylic acid sodium salt like Acusol 445 (Rohm & Haas). When sodium carbonate is included as an optional component in the detergent formulation of the present invention, it is preferred that sufficient amounts of a soil anti-redeposition agent be included to avoid encrustation on the inside of the washing machine. Generally, an amount of the soil anti-redeposition agent is included to prevent soil redeposition and/or encrustation on fabrics. Preferred amounts range from about 0.5% to about 40% by weight, more preferably from about 0.5% to about 4% by weight of the detergent formulation. Derivatives of cellulose, such as carboxymethylcellulose as well as polyethyleneglycols are suitable as soil anti-redeposition agents.

Another optional component that can be included in the detergent formulation of the present invention is a fabric softener. Generally, any known fabric softener can be included but preferred are quaternary ammonium compounds which have affinity to cellulosic fabrics due to their positive charge and to polyester fabrics due to the presence of an alkyl side chain. An example is a cationic quaternary ammonium compound like a polyethoxylated quaternary ammonium salt.

The quaternary ammonium compound preferably only has one alkyl side chain with approximately 8 to approximately 20 carbon atoms. Further, the quaternary ammonium compound should have one or more polyethoxy or polypropoxy side chains large enough to keep a 1% solution of the quaternary ammonium compound soluble in water at approximately 25° C. Substituents on the nitrogen that are not alkyl side chains from 8 to 20 carbon atoms and are not polyethoxy or polypropoxy side chains may be methyl, ethyl, hydroxymethyl, or hydroxyethyl. Examples include coconut quarternary amine ethoxylate like Varisoft 910 (Witco Chemical Co.), tallow quarternary amine ethoxylate like Varisoft 920, PEG-2-cocomonium chloride like Variquat 638 and Ethoquad C-12. Preferably, the quaternary fabric softener should form reversible complexes with anionic surfactants and if a mixture of the quaternary fabric softener and the anionic surfactant is sufficiently diluted, the softener and anionic detergent should separate into molecular species. Preferably, from about 1% to about 15% and more preferably from about 2% to about 4% by weight of the fabric softener can be present in the detergent formulation.

Set forth below is a table providing a listing of preferred ingredients for the detergent formulation with preferred ranges and most preferred ranges based on weight percents of the entire preferred detergent formulation.

TABLE 1

| Component | Preferred Range (Wt. Percent) | Most Preferred Range (Wt. Percent) |
|---|---|---|
| Hot Water | 20–90 | 40–59 |
| BioSoft S-100 | 0–40 | 5–15 |
| 50% Sodium Hydroxide | Neutralize Bio-Soft S-100 | Neutralize Bio-Soft S-100 |
| Acusol 445 ND | 0.5–40 | 0.5–4 |
| Blankophor BBH | 0.1–1.5 | 0.2–0.7 |
| Soda Ash | 0–60 | 5–20 |
| Ethox COA | 0.5–30 | 2–6 |
| Ethoquad C-12 | 1–15 | 2–5 |
| Blankophor SOL | 0.005–0.02 | 0.005–0.01 |
| Downey Super 0922 | 0–3 | 0.3–0.7 |
| Hastings Sky Blue OB | 0.001–0.5 | 0.01–0.025 |
| Sodium Omadine (40%) | 0.02–0.2 | 0.05–0.08 |
| Neodol 25-9 | 8–40 | 5–15 |
| Tergitol 15-S-9 | 0–30 | 0–2 |
| Tamol 731A | 0.5–10 | 0.5–2 |
| Valfor 100 | 0–60 | 10–20 |
| Silicate E | 2–30 | 2–5 |

The detergent compounds of the invention can be applied to the fabric substrate by means of a water slurry, from a melt, or from a solvent system.

Another embodiment of the present invention (Table 2) is a two part system, Part A and Part B, in which the parts are combined shortly before application to the fabric to produce Part C. Part C has the advantage of being a very high solids slurry which contains more soda ash and sodium silicate than the formula mentioned above in Table 1. This practice of the invention makes drying of the detergent slurry easier but requires in line mixing or other means of mixing Part A with Part B shortly before application to the fabric to avoid the difficulties presented by the upward drift in viscosity of the combination.

TABLE 2

| Component | Part A (Wt. Percent) | Part B (Wt. Percent) | Part C (Wt. Percent) |
|---|---|---|---|
| Water | — | 35 | 5.6 |
| Acusol 445 ND | 1.86 | — | — |
| Blankophor BBH | 1.86 | — | — |
| General Chemicals Light Soda Ash or FMC Grade 50 | 32.12 | — | — |
| Ethox COA | 12.85 | — | — |
| Ethoquad C-12 | 7 | — | — |
| Tinopal SWN | 0.03 | — | — |
| Surf M 0513 | 2.5 | — | — |
| Britesil C20 | 6 | — | — |
| Alzarine Blue CL (1% solution in water) | — | 1 | — |
| Sodium Omadine (40%) | — | 0.64 | — |
| Neodol 25-9 | 30 | — | — |
| Tergitol 15-5-9 | 5.8 | — | — |
| Tamol 731A | — | 6 | 1 |
| Valfor 100 | — | 57.36 | — |
| Part A | — | — | 46.7 |
| Part B | — | — | 46.7 |

It is preferred to apply the detergent formulations to the substrate sheet from a water slurry. However, applying the detergent formulations from a melt or from solvent is also possible. The following Table 3 gives the components of a water slurry (low soda ash formula), a melt formula, and a solvent formula.

TABLE 3

| Component (in Wt. Percents) | Low Soda Ash Formula | Melt Formula | Solvent Formula |
|---|---|---|---|
| Hot Water | 45.542 | — | — |
| Pluronic F77 | — | 40.042 | — |
| Acetone | — | — | 10.128 |
| Bio-Soft S-100 | 7.62 | 7.62 | 11.4 |
| 50% Sodium Hydroxide | 2.03 | 2.03 | 3 |
| Acusol 445 ND | 0.89 | 0.89 | 2.7 |
| Blankophor BBH | 0.43 | 0.43 | 0.65 |
| Soda Ash | 3.42 | 11.42 | 17.1 |
| Ethox COA | 3.27 | 3.27 | 4.9 |
| Ethoquad C-12 | 2.5 | 4 | 6 |
| Tinopal SWN | 0.008 | — | — |
| Blankophor SOL | — | 0.008 | 0.012 |
| Surf M 0513 | 0.51 | 0.51 | 0.75 |
| Hastings Sky Blue OB (7% solution in water) | 0.17 | 0.17 | 0.17 |
| Sodium Omadine (40%) | 0.07 | 0.07 | 0.1 |
| Neodol 25-9 | 9.16 | 9.16 | 13.7 |
| Tergitol 15-S-9 | 0.79 | 0.79 | 1.2 |
| Tamol 850 | 0.89 | — | — |
| Tamol 731A | 1 | 1 | 1.5 |
| Valfor 100 | 19.3 | 15.3 | 23 |
| Silicate E | 2.4 | 2.4 | 3.6 |
| Acusol 445ND | — | 0.89 | — |

A most preferred detergent formulation used in the water slurry application is the following:

TABLE 4

| Component | Wt. Percent |
|---|---|
| Hot Water | 40.042 |
| BioSoft S-100 | 7.62 |
| 50% Sodium Hydroxide | 2.03 |
| Acusol 445 ND | 0.89 |
| Blankophor BBH | 0.43 |
| Soda Ash | 11.42 |
| Ethox COA | 3.27 |
| Ethoquad C-12 | 4 |
| Blankophor SOL | 0.008 |
| Surf M 0513 | 0.51 |
| Hastings Sky Blue OB (7% solution in water) | 0.17 |
| Sodium Omadine | 0.07 |
| Neodol 25-9 | 9.16 |
| Tergitol 15-S-9 | 0.79 |
| Tamol 731A | 1.0 |
| Valfor 100 | 15.3 |
| Silicate E | 2.4 |

An additional formulation expressed in Table 5 incorporates oxidizing agents and enzymes in solvent.

TABLE 5

| Component | Wt. Percent |
|---|---|
| Methanol | 12.61 |
| BioSoft S-100 | 13.06 |
| 50% Sodium Hydroxide | 3.44 |
| Acusol 445 ND | 2.29 |
| Blankophor BBH | 0.69 |
| Dowfax Detergent Solution | 3.67 |
| Burcotase LP-100 | 0.34 |
| Burcotase DP-60 | 0.34 |
| Sodium Perborate Monohydrate | 5.73 |
| Soda Ash | 11.46 |
| Ethoquad C-12 | 6.88 |
| Tinopal SWN | 0.014 |
| Downey Super 0922 | 0.12 |
| Hastings Sky Blue OB (7% solution in water) | 0.29 |
| Sodium Omadine (40%) | 0.12 |
| Neodol 25-9 | 15.47 |
| Tamol 731A | 1.72 |
| Silicate E | 4.58 |
| Valfor 100 | 17.19 |

The slurries described above can be impregnated into the substrate using any device which forces the slurry into the substrate or allows the slurry to flow into the substrate. Examples of application equipment include standard coating equipment, slot applicators, various types of printing equipment, padding equipment, and spraying equipment. The substrate is then carried by a supporting device through a drying device and processed into sheets or wound into rolls. Examples of supporting devices include rollers, belts, and clip and pin frames. The web can be dried using vacuum extraction, or any type of radiant energy with wavelength longer than ultra violet, or using convection drying. For example, infrared preheaters with a gas fired forced air oven can be used.

The amount of the detergent formulation on a sheet which has the size of approximately 6"×6.5" is preferably at least 8 grams. Of course, this amount can be adjusted to any desired amount. A preferred amount is from about 14 grams to about 18 grams per 6"×6.5" sheet.

In making the detergent formulations of the present invention, the components can simply be stirred together to produce a homogeneous slurry. The components are preferably added in the order set forth in the tables. Once the slurry is formed, in order to apply the slurry to the substrate sheet to make the laundry sheet of the present invention, the slurry is pumped into a coating trough or other application device and impregnated or applied into or on the substrate sheet, preferably a low denier, high loft nonwoven fabric sheet. The sheet is supported in a horizontal and flat position while the water is evaporated from the sheet. The sheet can then be cut into desired shapes and sizes and placed in a box for use by the consumer. The detergent formulations set forth in Tables 1–4 are preferred because these slurries can be coated and dried on a tenter frame without causing excessive contamination to the winding, coating, and drying equipment. Further, these particular detergent formulations, upon being applied to the fabric or foam sheet are dry to touch and thus do not get the user's hands wet with detergent. It is preferred that the fabric or foam sheet be a needle punched fabric, but spun laced fabric or foam sheets can also be used.

An example that is illustrative of a process for producing the laundry sheet of the claimed invention is as follows.

PROCESS EXAMPLE 1

In a clean container equipped with appropriate stirring devices, the components of Table 4 are added stepwise to form a uniform paste. The compound is stirred to produce an even and uniform slurry that meets the following specifications.

| Test | Range |
|---|---|
| pH (1%) | 10–11.5 |
| Solids (oven) | 47.5%–49.5% |
| Specific gravity | 1.05–1.25 |
| Brookfield Viscosity | 4,500–9000 cps |
| Titration of 100 g in 900 ml water 20% acetic | 14.5–16.7 grams at pH7 |
| Color | pantone 297U |
| Fragrance | present |

The coating compound is then moved to the finishing facility to be applied to a fabric that is sufficiently strong to allow processing and have durability to laundering. A needlepunched polyester fabric produced from 4 denier×4" fiber; from 50 to 100 mils thick is a suitable substrate. Other types of fabrics or substrates with a surface area and void volume similar to this fabric would produce an acceptable product. The fabric is unrolled and fed into an on-the-frame knife coater such as a Mascoe 4TC where it is drawn under the coating applicator and over a foam rubber pad. The coating compound is held in a trough just in front of the coating knife and is applied to the fabric as it passes underneath. The coating is both impregnated into and coated onto the fabric in such a way that the coating is fiber reinforced thus reducing the tendency for sloughing off of the compound in downstream handling. The coating is applied to achieve from 34 to 42 ounces per square yard of wet coating.

The coated fabric is held on both selvages by the pin chain of the tenter frame as it is passed underneath infrared predryers to begin the drying process. The fabric is then processed through a gas fired convection oven at from 400–450 deg. F. at such a rate as necessary to dry the fabric. The product is then cooled with cool air and exited from the dryer, trimmed and rolled up for shipment. The fabric is then cut into swatches that allow for the proper amount of chemistry to be delivered to the laundry. The finished product conforms to the following specifications:

| | |
|---|---|
| Basis weight overall | 19–24 OSY |
| Dry add-on | 16–21 OSY |
| Thickness | 0.060" |
| Width | 60" |
| Wash durability | OK to 1 MW and dry |
| Fragrance | Present after laundering |
| Moisture content | <1% |

In addition, the fabric in the test load should show little or no static cling, and the sheet should shed little or no fiber into the test load.

As a result of the present invention, a laundry sheet can be made which contains a predetermined dose of detergent chemicals to provide convenience to consumers. Preferably the laundry sheet contains no fillers and is a concentrated product with as many multifunctional ingredients as possible. For example, the following ingredients can provide multiple functions.

| Ingredient | Functions |
|---|---|
| Sodium Aluminosilicate | Builder, Water Softener, Contributes to Dry Hand |
| Soda Ash | Builder, Water Softener, Contributes to Dry Hand, Raises pH for Better Polar Soil Detergency (Alkali Source) |
| Polycarboxylic Acids | Soil Anti-Redeposition Agents, Dispersant |
| Coconut Amine concentrates | Improves Detergency, Produces Foam (Esthetically Pleasing) |
| Hastings Sky Blue OB | Colors Coating, Optical Brightening |
| Sodium Silicate | Corrosion Inhibition, Builder, Water Softener, Dry Hand |

Other embodiments of the present invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A process for producing a laundry detergent article comprising:

a) preparing a detergent formulation comprising components in a slurry, said components comprising amphoteric, nonionic or anionic surfactants, and a builder, wherein said slurry has a viscosity ranging from 4500 to 9000 cps, wherein each of said components in the detergent formulation has a particle size ranging from about 1 to about 200 micron;

b) applying, in a single step process, said detergent formulation to a needlepunched, nonwoven substrate comprising fibers having a melting point of approximately 300° F. or greater; and c) drying said detergent formulation and substrate until it form said laundry detergent article that is dry to the touch and which does not substantially transfer detergent to other surfaces or to the skin when handled.

2. The process of claim 1, wherein said substrate is supported in a horizontal and flat position while said substrate and detergent formulation dry.

3. The process of claim 1, wherein said detergent formulation is applied by coating equipment, a slot applicator, printing equipment, padding equipment, or spraying equipment.

4. The process of claim 1, wherein said drying occurs on a supporting device selected from a roller, a belt, a clip or pin frame.

5. The process of claim 1, wherein said drying occurs on a accomplished by vacuum extraction, radiant energy having a wavelength longer than ultraviolet, or convection drying.

6. The process of claim 3, wherein said slurry is applied to achieve from 36 to 42 ounces per square yard of wet coating.

7. The process of claim 1, wherein said detergent formulation further comprises at least one component chosen from a complexing agent, an alkaline source, an optical brightener, an electrolyte, a foam stabilizer, a fragrance, a color enhancer, a biocide, a corrosion inhibitor, a soil anti-redeposition agent, an encrustation preventer, a fabric softener, an oxidizing agent, an enzyme, and a dye transfer inhibition agent.

8. The process of claim 1, wherein said surfactant comprises at least one component chosen from a linear primary alcohol ethoxy sulfate, a linear alkyl benzene sulfonate, an alcohol sulfate, a sodium or potassium salt of a long chain fatty acid, a secondary alkane sulfonate, a $\alpha$-olefin sulfonate, a cocoamphocarboxylipropionate, and a methylester sulfonate.

9. The process of claim 1, wherein said nonionic surfactant is an alcohol ethoxylate, an alkylphenol ethoxylate, an ethyleneoxide/propyleneoxide block copolymer, an alkyl polyglycoside, an alkanolamide, an amine ethoxylate, or an amine oxide.

10. The process of claim 1, wherein said anionic surfactant is a alkylated sulfonated diphenyl oxide disodium salt or a dioctyl sulfosuccinamate.

11. The process of claim 1, wherein said needlepunched, nonwoven substrate is a polyester material.

12. The process of claim 1, wherein said builder is a borate, a phosphate, a polyphosphate, a silicate, a carbonate, a citrate, an ethylenediaminetetracetate, or a nitrilotriacetate.

13. The process of claim 12, wherein said builder is a zeolite.

14. The process of claim 7, wherein said optical brightener comprises bistriazinyl aminostilbene.

15. The process of claim 1, wherein said alkaline source is sodium carbonate, sodium silicate, a polymethacrylate or a methacrylate maleic anhydride copolymer.

16. The process of claim 7, wherein said electrolyte is sodium carbonate.

17. The process of claim 7, wherein said foam stabilizer is an alkanolamide, an amine oxide, or a dioctylsulfosuccinamate.

18. The process of claim 7, wherein said biocide is sodium omadine.

19. The process of claim 7, wherein said corrosion inhibitor is a sodium silicate or a sodium polysilicate.

20. The process of claim 7, wherein said soil anti-redeposition agent is an isobutylene/maleic anhydride copolymer sodium salt, sodium polyacrylate, sodium polymaleic acid/olefin, sodium polyacrylic acid maleic acid salt, or a sodium polymethacrylate.

21. The process of claim 7, wherein said fabric softener is a quaternary ammonium compound.

22. The process of claim 21, wherein said quaternary ammonium compound further contains at least one polyethoxy or polypropoxy side chain sufficient to keep a 1% solution of the quaternary ammonium compounds soluble in water at approximately 25° C.

23. The process of claim 1, wherein said detergent formulation comprises a sodium salt of a dodecyl benzene sulfonic acid, an alkylated sulfonated diphenyl oxide disodium salt, a zeolite, a bistriazinylaminostilbene, sodium carbonate, an amine oxide or an alkanol amine, a sodium silicate or sodium polysilicate, an isobutylene/maleic anhydride copolymer or a sodium polymethacrylate, and a quaternary ammonium compound.

24. The process of claim 23, wherein said quaternary ammonium compound has at least one polyethoxy or polypropoxy side chain sufficient to keep a 1% solution of the quaternary ammonium compounds soluble in water at about 25° C.

25. A laundry detergent article made by the process of claim 1.

26. A laundry detergent article made by the process of claim 7.

27. A laundry detergent article made by the process of claim 23.

* * * * *

UNITED STATES PATENT AND TRADEMARK OFFICE

CERTIFICATE OF CORRECTION

PATENT NO. : 6,864,196 B2
DATED : March 8, 2005
INVENTOR(S) : Lonzell Graham et al.

It is certified that error appears in the above-identified patent and that said Letters Patent is hereby corrected as shown below:

Column 12,
Line 49, "200 micron;" should read -- 200 microns; --.
Line 55, "form" should read -- forms --.

Column 13,
Lines 1-2, "occurs on a accomplished" should read -- is accomplished --.
Line 28, "a alkylated" should read -- an alkylated --.
Line 40, after "polymethacrylate", insert a comma.

Signed and Sealed this

Twenty-fourth Day of May, 2005

JON W. DUDAS
*Director of the United States Patent and Trademark Office*